United States Patent [19]

Pollart

[11] 4,058,261
[45] Nov. 15, 1977

[54] AERATION TUBE

[76] Inventor: Gary M. Pollart, P.O. Box 1558, Guymon, Okla. 73942

[21] Appl. No.: 659,424

[22] Filed: Feb. 19, 1976

[51] Int. Cl.² .................. B05B 1/14; B05B 15/00; F16L 41/02
[52] U.S. Cl. ............................. 239/542; 239/550; 239/590.5; 239/600; 239/602; 285/194; 285/DIG. 22
[58] Field of Search ........... 239/271, 542, 550, 590.3, 239/590.5, 600, 602; 285/5, 6, 167, 208, 209, 210, DIG. 22, 194, 235, 257, 260, 322, 382; 138/118, 155, 178; 403/244

[56] References Cited

U.S. PATENT DOCUMENTS

| | | | |
|---|---|---|---|
| 2,560,776 | 7/1951 | Peters | 285/DIG. 22 |
| 3,037,710 | 6/1962 | Kusznier | 239/542 X |
| 3,429,125 | 2/1969 | Shotton | 239/542 X |
| 3,490,791 | 1/1970 | Mitchell | 285/208 X |
| 3,934,824 | 1/1976 | Fitzhugh | 239/542 X |

FOREIGN PATENT DOCUMENTS

| | | | |
|---|---|---|---|
| 1,384,409 | 11/1964 | France | 239/542 |
| 278,805 | 10/1927 | United Kingdom | 285/210 |

*Primary Examiner*—Evon C. Blunk
*Assistant Examiner*—Andres Kashnikow
*Attorney, Agent, or Firm*—William R. Laney

[57] ABSTRACT

A tube structure for attachment to an irrigation pipe for non-erosively distributing water from the pipe to the ground, the tube comprising a shapeable, deformable tubular first end portion, a plurality of retainer hooks secured to said first end portion and a second tubular end portion. A pair of spaced diffuser screens are positioned in, and extend transversely across, the second end portion of the tube.

8 Claims, 4 Drawing Figures

U.S. Patent    Nov. 15, 1977    4,058,261
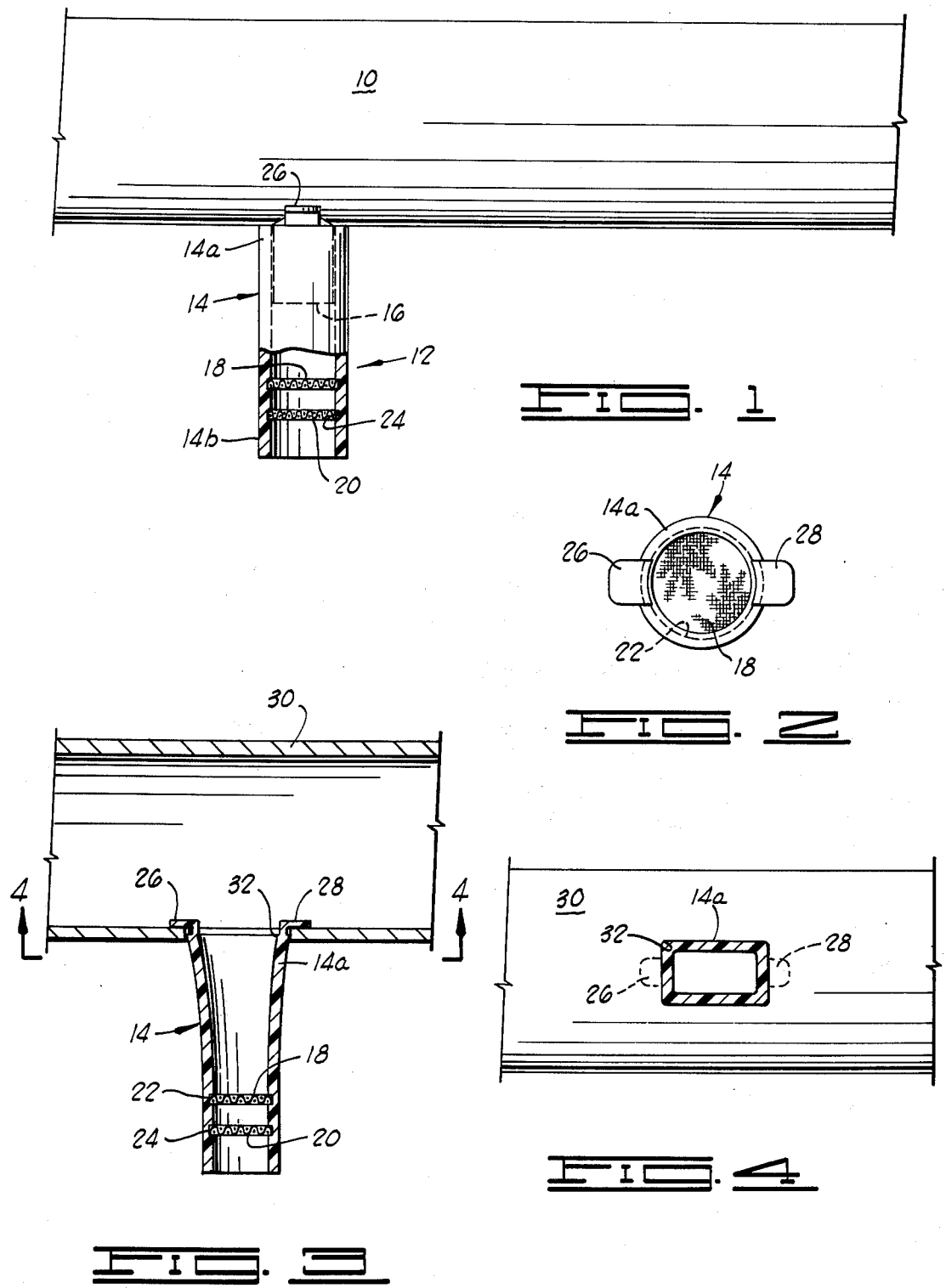

AERATION TUBE

BACKGROUND OF THE INVENTION

1. Field of the Invention

This application relates to diffuser structures which are attached to irrigation pipes in order to diffuse a jet or stream of water emanating from the pipe prior to the time water impinges on the ground for irrigation purposes, the purpose of such structure being to thereby obviate or reduce the erosive effect of the water stream impinging upon the earth.

2. Brief Description of the Prior Art

In the irrigation of agricultural crops by the method of utilizing a large water-distributing pipeline, a problem has existed of the erosive effect caused by the water jets or streams discharged from the pipe to the ground. Frequently, such water jets or streams are discharged from the large irrigation pipes at sufficient velocity, and over sufficiently extended periods of time, that the soil is washed away or eroded around the small plants, and damage to the crop can result as well as loss of topsoil.

In order to alleviate the described erosive effect of the water jets or streams emanating from the irrigation pipe, it has been proposed to diffuse such streams by the provision of fittings or adaptors which are connected to the pipe and cause the water discharged therefrom to pass through diffuser plates or screens of various types. These structures have worked adequately for the purpose of breaking up the water jet and reducing erosion. However, due to the various types of irrigation pipes which may be utilized, and more specifically, to the types of holes, orifices or nipples, commonly called gates, which are provided on such pipes to discharge the irrigating water therefrom, it has been necessary to provide a number of different types of diffusion devices for use with the different types of irrigation pipes. In some instances, the diffusion devices include sleeves which are intended to be pressed over a gate which is provided on the irrigation pipe, and in other instances, a conduit or receptacle is simply pressed up against the side of the irrigation pipe at a location where a hole is formed in the walls of the pipe to permit the water to be discharged therefrom. In the latter instance, there is often some leakage of water at the entrance of the diffusion device where the water, instead of passing through the diffusing plates or screens located in such device, drips down onto the ground in a sufficient volume and velocity to cause some undesirable erosion, and also less than optimum placement of this water in relation to the crops.

GENERAL DESCRIPTION OF THE PRESENT INVENTION

The present invention comprises a diffusion tube which is useful on a variety of types of irrigation pipe to receive and discharge water from the pipe toward the ground in a stream which has been broken up and aerated so that erosion of the soil is minimized. The diffusion tube of the invention broadly comprises a shapeable, deformable tubular first end portion which, by reason of this construction, can be pressed over a spigot or spout formed on the irrigation pipe and projecting therefrom for the purpose of discharging water, or can be deformed so as to permit the mouth or opening of the tubular first end portion to be pressed through a slot or hole cut in the side of the pipe with a fairly close fit which allows a minimum of seepage or leakage of water around the tubular first end portion of the diffusion tube. When the tube is used in this latter way, a plurality of retainer hooks which are secured to the inserted end portion of the tube are used to hook over the internal wall of the irrigation pipe and prevent the water pressure from extruding or thrusting the tube out of the pipe. A second end portion of the diffusion tube which may be formed integrally with the tubular first end portion, or may be a separate member, contains spaced diffuser screens which are positioned in the second tubular end portion of the tube and extend transversely thereacross.

An important object of the present invention is to provide a diffusion or aeration apparatus which is adaptable for usage on a variety of types of irrigation pipes, and which functions to receive relatively high velocity water from the irrigation pipe and subject it to a diffusing process which breaks up the water stream and reduces the erosive effect of the discharged water when it contacts the earth to be irrigated.

A further object of the invention is to provide an improved aeration tube for use with irrigation piping, which is relatively simple and economical to construct, but is characterized by a long and trouble-free operating life.

A specific object of the invention is to provide an aeration or diffusion tube which can be quickly and easily used with either spigot or nipple-type discharge structures on an irrigation pipe, or can be used with a slotted or apertured irrigation pipe not having such nipples or spigots thereon.

Additional objects and advantages of the invention will become apparent as the following detailed description of a preferred embodiment of the invention is read in conjunction with the accompanying drawing which illustrates such preferred embodiment.

BROAD DESCRIPTION OF THE DRAWINGS

FIG. 1 is a plan view illustrating the aeration tube of the invention as it appears from above and when attached to a spigot or nipple carried by an irrigation pipe. A portion of the aeration tube has been broken away to better illustrate the construction of the tube. The nipple fitting to which the tube is attached is shown in dashed lines.

FIG. 2 is an end elevation view of the aeration tube depicting the flared ears or hooks which are formed on one end of the aeration tube.

FIG. 3 is a plan view similar to FIG. 1 with a portion of the irrigation pipe and tube cut away to better illustrate a second mode of usage of the diffusion tube.

FIG. 4 is a transverse cross-sectional view taken along line 4—4 of FIG. 3 and depicting the cross-sectional configuration of a portion of the diffusion tube when it is used in the mode illustrated in FIG. 3.

DETAILED DESCRIPTION OF THE PREFERRED EMBODIMENT OF THE INVENTION

Referring initially to FIG. 1 of the drawing, the diffusion tube of the invention is depicted therein as attached to an irrigation pipe 10, and is designated generally by reference numeral 12. The diffusion tube, in the illustrated embodiment, can be described as an elongated tubular member 14 which has an inner end portion 14a and an outer end portion 14b. In general, the tubular member 14 is preferably from about four inches in length to about ten inches in length, and is constructed of a deformable material having a small amount of resiliency. In a preferred embodiment, the tubular member is a single unitary element formed of one piece of material. In an alternate mode of construction, the inner end portion 14a of the tubular member 14 can be constructed of such deformable material, and the outer end portion 14b can be constructed of a less flexible material. The cross-sectional configuration of the tubular member 14 can vary and, of course, in such deformable portions of the tubular member as are provided, can be altered in their shape, preferably by manual deformation, to assume various cross-sectional configurations for a purpose hereinafter described. The outer end portion 14b is preferably circular in cross-section in all embodiments of the invention. When the tubular element 14 is made as a single unit, it is preferably formed of a heavy rubber material with a relatively low elastic memory characteristic, or of a synthetic resin.

As shown in FIG. 1, the tubular member 14 is pressed over a spigot or nipple 16 which projects out from the side of the irrigation pipe 10. Water from the irrigation pipe 10, which is disposed at a height of from three to six inches above the ground, is discharged through the spigot 16 in an arcing stream which impinges on the surface of the earth with relatively high velocity. Over extended periods of irrigation, this impingement causes significant erosion. In one use of the diffusion tube 12, the inside diameter of the inner end portion 14a of the tubular member 14 is slightly less than the outside diameter of the spigot 16 so that when the tubular member is pressed over the spigot in the manner shown, a relatively firm and tenacious frictional engagement is established. Preferably, the inner end portion 14a of the tubular member 14 is pressed all the way inwardly on the spigot 16 until it abuts the outside wall of the pipe 10.

Near its outer end, and located within the outer end portion 14b, the tubular member 14 carries a plurality of internally disposed, transversely extending screens. Two of the screens are illustrated in the depicted embodiment, with the upstream screen being designated by reference numeral 18 and the downstream screen being designated by reference numeral 20. It will be perceived in referring to FIGS. 1 and 2 that each of the screens 18 and 20 is a disc-shaped member having a circular outer periphery, with the outer periphery of each of the screens disposed in receiving grooves 22 and 24, respectively, formed in the internal wall of the outer end portion 14b of the tubular member 14. Preferably, the outermost screen 20 is disposed inwardly a distance of from ½ to 2 inches from the outer end of the tubular member 14. The distance which separates the inner screen 18 from the outer screen 20 can be varied according to the diffusion characteristic which it is desired to impart to the stream of water discharged through the aeration tube 12.

Secured to the end of the tubular member 14 which terminates the inner end portion 14a thereof are a plurality of radially outwardly projecting retainer hooks or ears 26 and 28. The retainer hooks or ears 26 and 28 can be formed integrally with the material of construction of the tubular member 14. The hooks or ears 26 and 28 each include a right angle bend, with a first portion projecting axially from the tubular member 14 and a second portion extending normal to the axis of the tubular member. As an alternate construction, the hooks or ears 26 and 28 can be formed of wire elements which are embedded deeply in the walls of the tubular member 14 and are bent in the fashion described, with the wire formed in a loop at the radially outer end of the hook constituted thereby. In the illustrated embodiment, two of the hooks, 26 and 28, are illustrated and are disposed on diametrically opposite sides of the tubular member 14. It will be understood, however, that more than two of the hooks can be provided, and, when additional hooks are employed, they are preferably spaced at equal intervals around the periphery of the inner end of the tubular member.

An important feature of the present invention is the susceptibility of the diffusion tube 12 of the invention to use on different types of irrigation pipe constructions. As previously described herein, some types of irrigation pipe in use provide discharge openings or slots, in the wall of the irrigation pipe in lieu of spigots or nipples which project outwardly from the irrigation pipe. The water is then simply discharged through such openings or slots, and substantially the same problem of soil erosion occurs from the impingement of the discharged streams of water upon the earth below the irrigation pipe. The diffusion tube of the present invention is susceptible to use on such irrigation pipes of the slotted or apertured types. Usage of the tube in this fashion is best illustrated in FIGS. 3 and 4.

In referring to FIG. 4, an irrigation pipe 30 of the slotted wall type is illustrated, and a water discharge slot formed therein is shown at 32. In order to accommodate the diffusion tube 12 of this invention to use on a slotted irrigation pipe of this type, the shapeable and deformable end portion 14a is shaped to a generally rectangular configuration for the purpose of fitting within the rectangular slot or openings 32 formed in the wall of the irrigation pipe 30. The end portion 14a is then pushed into the opening 32 in the pipe 30 and, by reason of the deformation and slight elastic property of the tubular member 14a is made to conform and be complementary to the geometric configuration of the opening in the pipe 30. This shape is best illustrated in FIG. 4 of the drawings where the cross-sectional configuration of the inner end portion of the tubular member 14 is depicted.

When the inner end portion 14a of the tubular member 14 is so shaped and is placed in position in the slot 32, the hooks or ears 26 and 28 extend along the inside wall of the irrigation pipe 30 and retain the tubular member 14 in the water receiving position within the slot 32, as illustrated in FIGS. 3 and 4. It should be noted that where the diffusion tube 12 is an integral unitary member, its length is sufficiently great that changes in the cross-sectional configuration of the inner end portion 14a to permit the tube to be used, either on a cylindrically shaped spigot 16 of the sort shown in FIG. 1, or in a rectangularly shaped slot in the pipe as shown in FIGS. 3 and 4, will not significantly alter the cross-sectional configuration of the outer end portion 14b of the tubular member. Thus, the diffusion screens 18 and 20 are not distorted or altered in their configuration, and are not damaged by the shaping of the inner end portion of the tubular member 14 for purposes of adapting it to use on various types of irrigation pipe.

When it is desired to remove or release the diffusion tube from its operative position in a slotted irrigation pipe 30 as shown in FIGS. 3 and 4, the user can simply compress the side walls of the inner end portion 14a of the tubular member 14 toward each other to extricate the tubular member from the opening in the pipe 30. This deformation of the inner end portion 14a of the tubular member 14 can be carried out to an extent such that the hooks or ears 26 and 28 can clear the opening, and permit release and removal of the tube.

Although a preferred embodiment of the invention has been herein described in detail and is illustrated in the drawing, it is to be understood that various changes and innovations in the illustrated and described structure can be effected without departure from the basic principles of the invention. Changes and innovations of this type are therefore deemed to be circumscribed by the spirit and scope of the invention except as the same may be necessarily limited by the appended claims or reasonable equivalents thereof.

What is claimed is:

1. In combination:
   an irrigation pipe for conducting irrigation water;
   means for discharging water from the interior of the pipe to the ground through an opening in the wall of the pipe; and
   a tubular aeration device mounted adjacent the side of the pipe and positioned to communicate its interior with said opening in the wall of the pipe, said device comprising:
   a shapeable, manually deformable tubular first end portion of selectively variable cross-sectional configuration;
   a plurality of retainer hooks secured to said tubular first end portion, and including portions projecting normal to the axis of said tubular first end portion and radially outwardly of the external wall of said tubular first end portion;
   a second tubular end portion connected to said first tubular end portion; and
   a plurality of rigid diffusion screens positioned in, and extending transversely across, said second tubular end portion.

2. The combination defined in claim 1 wherein said tubular first end portion is positioned in said opening and said retainer hooks are positioned within the pipe and bear against the inside surface of the pipe wall.

3. The combination defined in claim 1 wherein said first end portion, second end portion and retainer hooks are one unitary, integrally formed structure.

4. The combination defined in claim 1 wherein each of said hooks is L-shaped in configuration.

5. The combination defined in claim 1 wherein said first end portion and said second end portion of said tubular aeration device are one unitary, integrally formed structure, and wherein the length and material of construction of said aeration device are such that the tubular member can be manually deformed from a cylindrical configuration over its length to a configuration in which the first end portion is of rectangular cross-sectional configuration, and said second end portion remains unaltered in shape and is of circular cross-sectional configuration on opposite sides of said diffusion screens.

6. The combination defined in claim 5 wherein said tubular first end portion is positioned in said opening and said retainer hooks are positioned within the pipe and bear against the surface of the pipe wall.

7. The combination defined in claim 6 wherein each of said hooks is L-shaped in configuration.

8. An aeration device adapted for attachment to an agriculture irrigation pipe comprising:
   an elongated tubular member having a manually deformable first tubular end portion shapeable to a selected cross-sectional configuration, and having a pair of axially spaced grooves in the internal wall of said tubular member at a location therein spaced from said first tubular end portion;
   a plurality of retainer hooks secured to said first tubular end portion and each including portions projecting radially outwardly with respect to said tubular member in a direction substantially normal to the axis thereof; and
   diffusion screen means extending transversely across said tubular member at a location therein spaced from said first tubular end portion and engaging said grooves in the internal wall of said tubular member.

* * * * *

UNITED STATES PATENT OFFICE
CERTIFICATE OF CORRECTION

Patent No. 4,058,261         Dated November 15, 1977

Inventor(s) Gary M. Pollart

It is certified that error appears in the above-identified patent and that said Letters Patent are hereby corrected as shown below:

Column 3, line 46, after "receiving" insert --annular--.

Signed and Sealed this

Eighteenth Day of April 1978

[SEAL]

Attest:

RUTH C. MASON
Attesting Officer

LUTRELLE F. PARKER
Acting Commissioner of Patents and Trademarks